(12) United States Patent
Bakke et al.

(10) Patent No.: US 7,843,903 B2
(45) Date of Patent: Nov. 30, 2010

(54) METHODS, SYSTEMS, AND COMPUTER PROGRAM PRODUCTS FOR EMERGENCY 911 (E911) REGISTRATION ASSISTANCE FOR SUBSCRIBERS USING PORTABLE INTERNET PROTOCOL (IP) COMMUNICATIONS DEVICES

(75) Inventors: Steve Bakke, Addison, TX (US); Subash Madhusudan, Dallas, TX (US); Gary L. Brannick, Plano, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 964 days.

(21) Appl. No.: 11/267,931

(22) Filed: Nov. 4, 2005

(65) Prior Publication Data

US 2007/0104183 A1 May 10, 2007

(51) Int. Cl.
*H04L 12/66* (2006.01)
(52) U.S. Cl. ............... 370/354; 370/352; 370/353; 370/355; 370/389; 370/390; 379/37; 379/45; 379/50; 379/201.06; 455/404.2; 455/432.1; 455/435.1; 455/456.2; 455/456.3; 709/203; 709/221; 709/222
(58) Field of Classification Search ......... 370/351–356, 370/389–390; 379/37, 45, 50, 201.06; 455/404.2, 455/432.1, 435.1, 456.1–456.3; 709/203, 709/221–222
See application file for complete search history.

(56) References Cited

U.S. PATENT DOCUMENTS

| 6,446,127 | B1   | 9/2002  | Schuster et al. |           |
|-----------|------|---------|-----------------|-----------|
| 6,650,901 | B1 * | 11/2003 | Schuster et al. | 455/456.1 |
| 6,665,611 | B1 * | 12/2003 | Oran et al.     | 701/213   |
| 6,675,017 | B1 * | 1/2004  | Zellner et al.  | 455/456.1 |
| 6,678,357 | B2 * | 1/2004  | Stumer et al.   | 379/45    |
| 6,707,888 | B1 * | 3/2004  | Cope            | 379/45    |
| 6,927,727 | B2 * | 8/2005  | Cleghorn        | 342/357.07|
| 6,934,274 | B2   | 8/2005  | Inoue et al.    |           |
| 6,937,713 | B1   | 8/2005  | Kung et al.     |           |
| 6,940,950 | B2 * | 9/2005  | Dickinson et al.| 379/45    |
| 7,062,572 | B1 * | 6/2006  | Hampton         | 709/245   |

(Continued)

OTHER PUBLICATIONS

M. Handley et al, Internet Engineering Task Force, RFC 2543 "SIP: Session Initiation Protocol" Mar. 1999, section 4.2.3 Options.*

(Continued)

*Primary Examiner*—Hemant Patel
(74) *Attorney, Agent, or Firm*—Jenkins, Wilson, Taylor & Hunt, P.A.

(57) ABSTRACT

Methods, systems, and computer program products for E911 registration assistance for subscribers using portable Internet Protocol (IP) communications devices are disclosed. According to one method, an IP address of a portable IP communications device is stored. A message is received that indicates an IP address of the portable IP communications device. Next, it is determined whether a difference between the stored IP address and the received IP address indicated by the registration message indicates a change in geographic location of the portable IP communications device. In response to determining that the difference between the stored IP address and the IP address indicated by the received message indicates a change in geographic location of the portable IP communications device, a subscriber is prompted to update stored geographic location information for providing E911 service to the subscriber.

52 Claims, 5 Drawing Sheets

U.S. PATENT DOCUMENTS

| | | | |
|---|---|---|---|
| 7,127,044 B1 * | 10/2006 | Becker et al. | 379/45 |
| 2003/0225893 A1 * | 12/2003 | Roese et al. | 709/227 |
| 2004/0057425 A1 * | 3/2004 | Brouwer et al. | 370/352 |
| 2004/0190497 A1 * | 9/2004 | Knox | 370/352 |
| 2005/0007999 A1 * | 1/2005 | Becker et al. | 370/352 |
| 2005/0083911 A1 * | 4/2005 | Grabelsky et al. | 370/352 |
| 2005/0129003 A1 | 6/2005 | Baeder et al. | |
| 2005/0185639 A1 | 8/2005 | Lee et al. | |
| 2005/0213716 A1 * | 9/2005 | Zhu et al. | 379/45 |
| 2009/0070406 A1 * | 3/2009 | Terpstra et al. | 709/203 |

OTHER PUBLICATIONS

Cauley, "AT&T Solves VoIP's 911 Issue," USA Today.com, pp. 1-2 (Oct. 11, 2005).

"Encyclopedia: Session Border Controller," www.nationmaster.com/encyclopedia/Session-Border-Controller, pp. 1-2 (Copyright May 2003).

Notification of Transmittal of the International Search Report and the Written Opinion of the International Searching Authority, or the Declaration for International Application No. PCT/US06/43038 (May 16, 2007).

"Electronic Code of Federal Regulations," e-CFR, 10 pages (Jun. 3, 2005).

* cited by examiner

METHODS, SYSTEMS, AND COMPUTER PROGRAM PRODUCTS FOR EMERGENCY 911 (E911) REGISTRATION ASSISTANCE FOR SUBSCRIBERS USING PORTABLE INTERNET PROTOCOL (IP) COMMUNICATIONS DEVICES

TECHNICAL FIELD

The subject matter disclosed herein relates generally to providing registration assistance for E911 services. More particularly, the subject matter disclosed herein relates to E911 registration assistance for subscribers using portable IP communications devices.

BACKGROUND

E911 or 911 service involves providing call centers or public safety access points (PSAPs) that answer 911 calls and dispatch emergency personnel based on the calls. An important part of E911 service is identifying and dispatching the emergency personnel to the location of the emergency. In order to facilitate such identifying and dispatching, conventional PSTN switches store and provide street address information to PSAPs for 911 calls.

For voice over IP (VoIP) calls, VoIP E911 standards promulgated by the Federal Communications Commission (FCC) require that Voice over Internet Protocol (VoIP) service providers store the geographic location and identity information of subscribers so that such information may be provided to emergency personnel when a subscriber initiates a 911 call from the subscriber's portable IP communications device. FCC rules also require that VoIP service providers transmit the location and identity information of a subscriber to a PSAP when the subscriber dials 911 from the subscriber's portable IP communications device.

In order for emergency personnel to be dispatched to the correct location, the VoIP service provider must maintain an accurate database associating a portable IP communications device with its actual geographic location. Thus, when a portable IP communications device is moved from one geographic location to another, the geographic location information in the service provider's database should be updated. Currently, a subscriber must remember to notify his or her service provider of a geographic location update when a portable IP communications device is moved from one geographic location to another. Relying on the subscriber's memory to trigger the updating of the geographic information is undesirable because the subscriber may forget to update the information. As a result, an E911 call originating from the subscriber's office may result in emergency personnel being dispatched to the subscriber's home, if the subscriber's VoIP telephone is moved from the subscriber's home to the subscriber's office without updating the stored geographic information for the subscriber.

Accordingly, there exists a need for methods, systems, and computer program products for providing improved E911 registration assistance for subscribers using portable IP communications devices.

SUMMARY

According to one aspect, the subject matter described herein includes a method for providing registration to a subscriber using a portable IP communications device. As used herein, the term "portable IP communications device" refers to a communications device that uses packets for media stream communications and that is capable of being moved and operated in different geographic locations. An example of a portable IP communications device is a landline IP telephone.

One method includes storing an IP address of a portable IP communications device. Next, a registration message is received that indicates an IP address of the portable IP communications device. Next, it is determined whether a difference between the stored IP address and the received IP address indicated by the registration message indicates a change in geographic location of the portable IP communications device. A subscriber is prompted to update stored geographic location information for the subscriber if it is determined that the difference between the stored IP address and the IP address indicated by the received message indicates a change in geographic location of the portable IP communications device.

The subject matter described herein providing E911 registration assistance to IP communications devices may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Exemplary embodiments of the subject matter will now be explained with reference to the accompanying drawings, of which.

DETAILED DESCRIPTION

Figure 1:
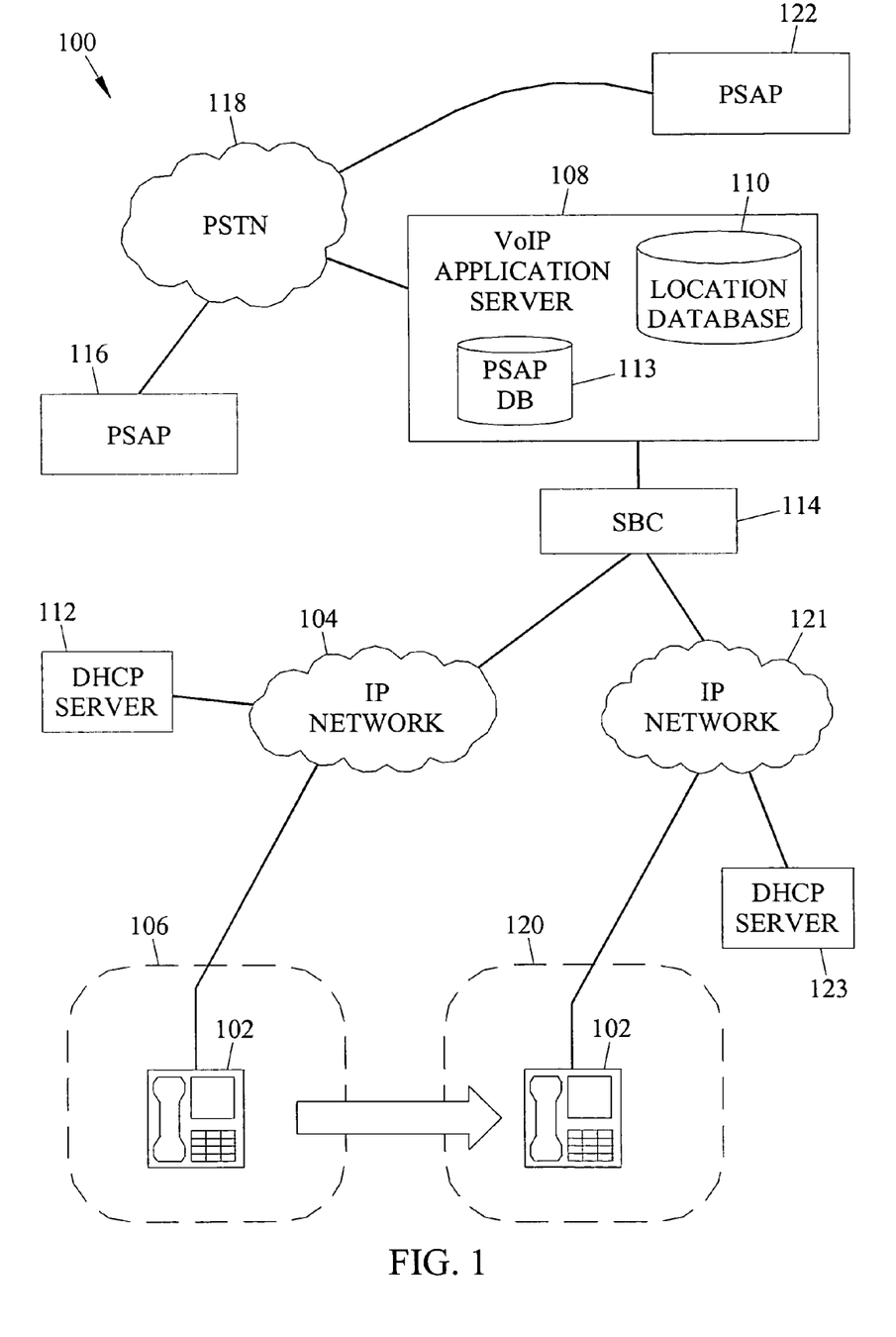
FIG. 1 is a network diagram of an exemplary communications network in which E911 registration assistance is provided for a subscriber using a portable IP communications device according to an embodiment of the subject matter described herein.

FIG. 1 illustrates an exemplary communications network 100 in which E911 registration assistance is provided for a subscriber using a portable IP communications device, such as a landline IP telephone 102, according to an embodiment of the subject matter described herein. Referring to FIG. 1, IP telephone 102 may be initially connected to an IP network 104 and located within a geographic region 106. IP telephone 102 may be provided with VoIP service by a VoIP application server 108 in communication with IP network 104. More particularly, VoIP application server 108 may maintain call state machines for calls involving IP telephone 102, generate new call setup messages, such as INVITE messages, route calls, and update connected subscriber and routing databases. For 911 calls, IP application server 108 may locate an appropriate PSAP and route the calls to the appropriate PSAP.

According to an embodiment of the subject matter described herein, application server 108 includes a location database 110 for storing a telephone number, a physical IP address, and geographic location information associated with IP telephone 102. The physical IP address can be assigned by a Dynamic Host Configuration Protocol (DHCP) server 112 connected to IP network 104 when IP telephone 102 connects to IP network 104. The telephone number is the number by which IP telephone 102 can be reached. The geographic location information can indicate a street address, a city, and a postal code at which IP telephone 102 is located. Table 1 below shows an exemplary IP telephone record stored in a location database.

TABLE 1

Exemplary IP Telephone Record

| Telephone Number | Physical IP Address | Geographic Location Information |
|---|---|---|
| 123-456-7890 | 1.123.45.456 | 123 Main Street, Cary, NC 27519 |

VoIP application server 108 may further include a PSAP database 113 that maps geographic information, such as postal codes, to PSAP contact information. Table 2 shown below illustrates an example of PSAP mappings that may be maintained by VoIP application server 108.

TABLE 2

PSAP Contact Information

| Postal Code | PSAP Contact Number |
|---|---|
| 27500-27599 | 9194601000 |
| 27600-27699 | 9194602000 |
| 27700-27719 | 9194603000 |

Application server 108 may utilize the information in Tables 1 and 2 to determine the appropriate PSAP to contact when a 911 call is received. Accordingly, it is important that the subscriber's geographic information in Table 1 is kept to date.

When a 911 emergency call is originated from IP telephone 102, a call setup message including the dialed digits "911," the physical IP address of IP telephone 102 and the calling party telephone number are sent to application server 108 via IP network 104 and a session border controller (SBC) 114. In response to receiving the emergency call, application server 108 performs a lookup in location database 110 for geographic location information associated with the calling party telephone number indicated in the emergency message. On locating the geographic location information in location database 110, application server 108 may identify the PSAP using the data in Table 2 and route the call and the geographic location information associated with IP telephone 102 to a PSAP 116 via Public Switched Telephone Network (PSTN) 118. PSAP 116 services geographic region 108 in which IP telephone 102 resides. Upon receiving a 911 call from IP telephone 102, PSAP 116 may dispatch emergency personnel to the location indicated by the geographic location information.

IP telephone 102 may be moved from geographic region 106 to another geographic region 120. Within geographic region 120, IP telephone may be connected to SBC 114 via another IP network 121. When IP telephone 102 is connected to IP network 121 and activated, IP telephone 102 uses DHCP to obtain a new physical IP address from another DHCP server 123. The new physical IP address of IP telephone 102 is communicated to SBC 114 in a registration request message. SBC 114 can maintain a mapping between a logical IP address and the physical IP address of IP telephone 102. Parties communicating with IP telephone 102 utilize the logical IP address in order to communicate messages to IP telephone 102. SBC 114 can translate the logical IP address in received messages to the physical IP address of IP telephone 102 in order to route the messages to IP telephone 102. Conversely, the source IP address in messages communicated from IP telephone 102 to another party through SBC 114 is translated from the IP telephone's physical IP address to the logical IP address assigned by SBC 114.

In conventional networks, the physical IP address of the telephone is not communicated to VoIP application server 108 when a registration request is received. However, according to an embodiment of the subject matter described herein, SBC 114 may communicate the registration request message (or a new registration request message) to IP application server 108. The registration request message may include the physical IP address of IP telephone 102. As will be described in more detail below, when IP telephone 102 is moved to a new geographic location, IP application server 108 may utilize the IP address in the registration message to detect the change in geographic location and prompt the subscriber to update the geographic location information.

Figure 2:
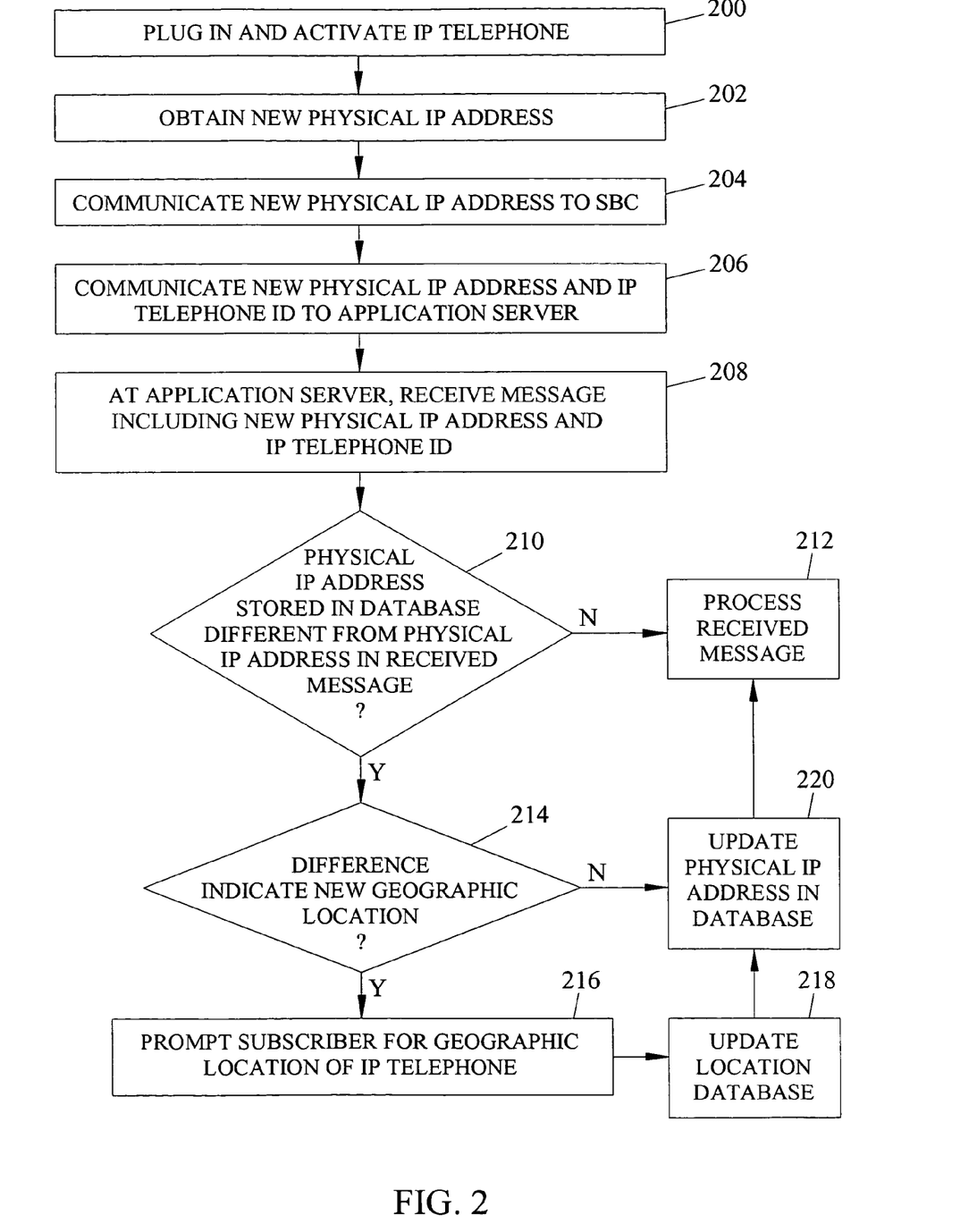
FIG. 2 is a flow chart of an exemplary process for providing E911 registration assistance for a subscriber using a portable IP communications device according to an embodiment of the subject matter described herein.

PSAP 122 provides emergency services to geographic region 120 in which IP telephone 102 has been moved. Location database 110 should be provided with updated geographic location information for IP telephone 102 so that emergency personnel can be dispatched to the correct location if an emergency call is received from IP telephone 102. FIG. 2 is a flow chart of an exemplary process for E911 registration assistance for the subscriber when changing the location of IP telephone 102 according to an embodiment of the subject matter described herein. Based on the indication of a location change, application server 108 can request geographic location information from a subscriber associated with IP telephone 102. Referring to FIG. 2, the process starts at step 200 where IP telephone 102 is plugged into IP network 121 within geographic region 120 and activated. IP telephone 102 was previously registered at and plugged into IP network 104 within geographic region 106, which is served by PSAP 116. IP telephone 102 is now within geographic region 120, which is served by PSAP 122. Thus, location database 110 should be updated with the new geographic location information for IP telephone 102.

Next, at step 202 of FIG. 2, IP telephone 102 uses DHCP to obtain a new physical IP address from DHCP server 123. IP telephone 102 then communicates a registration request message to SBC 114 including the new physical IP address of IP telephone 102 (step 204).

On receiving the registration request message including the new physical IP address, SBC 114 generates and communicates a message to application server 108 including the new physical IP address and identifying IP telephone 102 (step 206). IP telephone 102 may be identified by its telephone number. As stated above, SBC 114 may maintain a table for mapping a logical IP address to the physical IP address of IP telephone 102. The logical IP address and the physical IP address may both be communicated to application server 108.

The message communicated to application server 108 may be a registration request message for IP telephone 102 or any other suitable message communicated to application server 108. According to an embodiment, SBC 114 may communicate the new physical IP address of IP telephone 102 to application server 108 via any suitable message type or protocol. For example, SBC 114 may communicate the new physical IP address via Session Initiation Protocol (SIP), Cisco Skinny Client Control Protocol, or Media Gateway Control Protocol (MGCP), depending on the signaling protocol used in the network. Utilizing SIP, a Via header in a SIP message communicated to application server 108 may include the physical IP address of IP telephone 102. Utilizing MGCP, an MGCP ReStart In Progress (RSIP) message may be modified with an extension for carrying the physical IP address of IP telephone 102. Further, utilizing Cisco Skinny Client Control Protocol, a Cisco Skinny Client Control Protocol registration request message may be modified with an extension for carrying the physical IP address of IP telephone 102.

In step 208 of FIG. 2, application server 108 may receive the message from SBC 114 identifying IP telephone 102 and including the physical IP address of IP telephone 102. As stated above, location database 110 may include a record for IP telephone 102 that identifies a telephone number, a physical IP address, and geographic location information associated with IP telephone 102. The physical IP address may be the physical IP address obtained when IP telephone 102 was plugged into IP network 104 within geographic region 106. Accordingly, the geographic location information associated with the former physical IP address would no longer be valid. Accordingly, in step 210, application server 108 determines whether the stored physical IP address is different from the IP address in the received message. Application server 108 may perform a lookup in location database 110 to determine whether the physical IP address received in the message from SBC 114 is different from the physical IP address stored for IP telephone 102 in location database 110.

If the physical IP address in the received message is not different from the physical IP address stored in location database 110, the received message is further processed by server application 108 (step 212). Otherwise, if the physical IP address in the received message is different from the physical IP address stored in location database 110, control proceeds to step 214, where application server 108 compares the physical IP address in the received message and the physical IP address stored in location database 110 to determine whether the differences are sufficient to indicate a change in geographic location. Such an update may be necessary if IP telephone 102 is moved to a different building, a different city, a different state, or a location having a different street address. In one exemplary implementation, application server 108 can determine whether the comparison indicates that IP telephone 102 has moved to a different subnet. In this instance, if it is determined that IP telephone 102 has moved to a different subnet, the difference in the physical IP addresses is sufficient to indicate a change in geographic location. If it is determined that the difference indicates a change in geographic location, control proceeds to step 216 where the subscriber is prompted to update the geographic information.

In one exemplary implementation, a message may be sent to IP telephone 102 for requesting an update of the IP telephone's geographic location information. In another example, a call transaction may be initiated with IP telephone 102 in which a prerecorded message is played for requesting an update to the geographic location information. In yet another example, an e-mail message may be sent to the subscriber associated with IP telephone 102 for requesting the update to the geographic location information. In still another example, the geographic location information may be updated by sending an update request message to the subscriber over a web interface.

When provided with the updated geographic location information, the record in location database 110 associated with IP telephone 102 can be updated with the new geographic location information (step 218) and the received message processed (step 212). In the event of a 911 emergency call from IP telephone 102, application server 108 will know that PSAP 122 services the new location of IP telephone 102 and route the call and the geographic location information associated with IP telephone 102 to PSAP 122 for notifying emergency personnel of the 911 call. By updating the geographic location information for IP telephone 102, a message is not erroneously communicated to PSAP 116 for dispatching emergency personnel to the former location of IP telephone 102.

Returning to step 214, if it is determined that the difference between the IP address in the registration request message and the stored IP address does not include a change in geographic location, the physical IP address for the subscriber may be updated in location database 110 (step 220). Similarly, after the geographic information has been updated in step 218, the IP address may be updated in step 220. Once the IP address has been updated, the registration process continues in step 212 where the received registration request message is processed.

Figure 3:
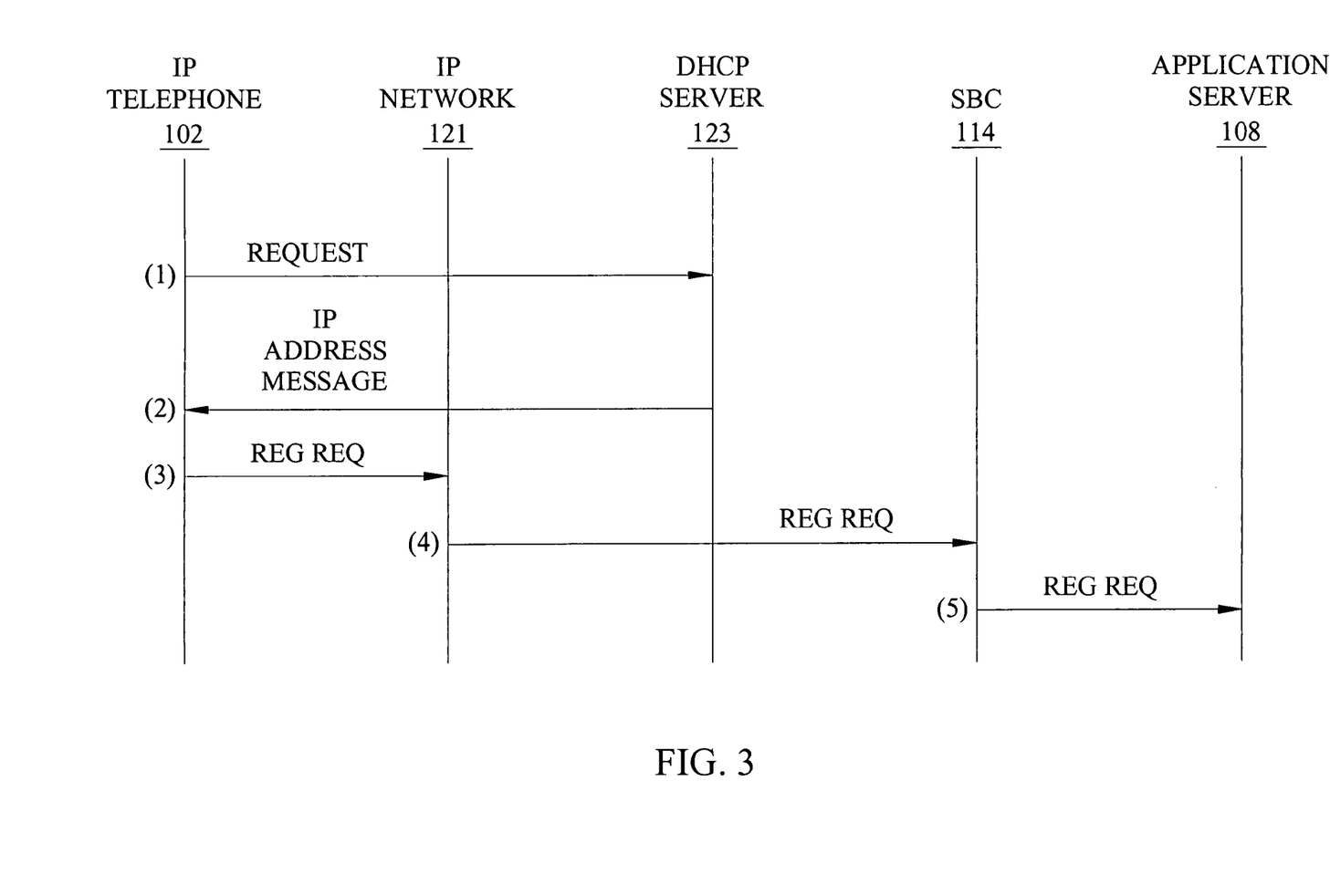
FIG. 3 is an exemplary message flow diagram of the transmission of messages in the network shown in FIG. 1 for providing E911 registration assistance for a subscriber using a portable IP communications device according to an embodiment of the subject matter described herein.

An exemplary signaling message flow illustrating messages exchanged between the network components illustrated in FIG. 1 in providing E911 registration assistance to a subscriber using IP telephone 102 according to an embodiment of the subject matter described herein will now be described in detail. FIG. 3 is an exemplary message flow diagram of the transmission of these messages in network 100 shown in FIG. 1. In this example, IP telephone 102 is moved from geographic region 106 where IP telephone 102 is plugged into IP network 104, activated, and assigned a new physical IP address. Further, location database 110 includes a record associated with IP telephone 102. The record includes a telephone number associated with IP telephone 102, the physical IP address assigned by DHCP server 112, and geographic location information indicating the location of IP telephone 102 within region 106. IP telephone 102 is then moved to geographic region 120 and plugged into IP network 121 and activated. Referring to line 1 of FIG. 3, IP telephone 102 sends a request to DHCP server 123 for a physical IP address. At line 2, DHCP server 112 transmits an IP address message to IP telephone 102 for indicating the new IP physical address assigned to IP telephone 102.

In line 3 of FIG. 3, IP telephone 102 transmits a registration request message to IP network 121. The registration request message may include the physical IP address assigned by DHCP server 123. In line 4, IP network 121 may forward the registration request message to SBC 114.

On receiving the registration request message, SBC 114 may generate another registration request message including the physical IP address assigned to IP telephone 102 by DHCP server 123. In line 5, the generated registration request message including the new physical IP address is transmitted to application server 108. The message communicated to application server 108 may be any suitable message that can identify IP telephone 102 and include the new physical IP address of IP telephone 102. Further, the message may be transmitted utilizing any suitable protocol, such as SIP, Cisco Skinny Client Control Protocol, or MGCP.

Application server 108 may compare the new physical IP address in the received message to the physical IP address stored in location database 110. If the physical IP addresses are sufficiently different, application server 108 can prompt the subscriber for a geographic location information update. The physical IP addresses are sufficiently different if the differences indicate that IP telephone 102 has been moved to a different location such that a request for geographic location information should be made. Such a request may be carried out by calling the subscriber to obtain an update. Further, application server 108 may update the record for IP telephone 102 with the new physical IP address. When new geographic location information is obtained, the record for IP telephone 102 may also be updated with the new geographic location information. As a result, when a 911 emergency call is initiated from IP telephone 102, location database 110 will include a record for IP telephone 102 that contains geographic location information indicating the new location of IP telephone 102 within geographic region 120.

Figure 4:
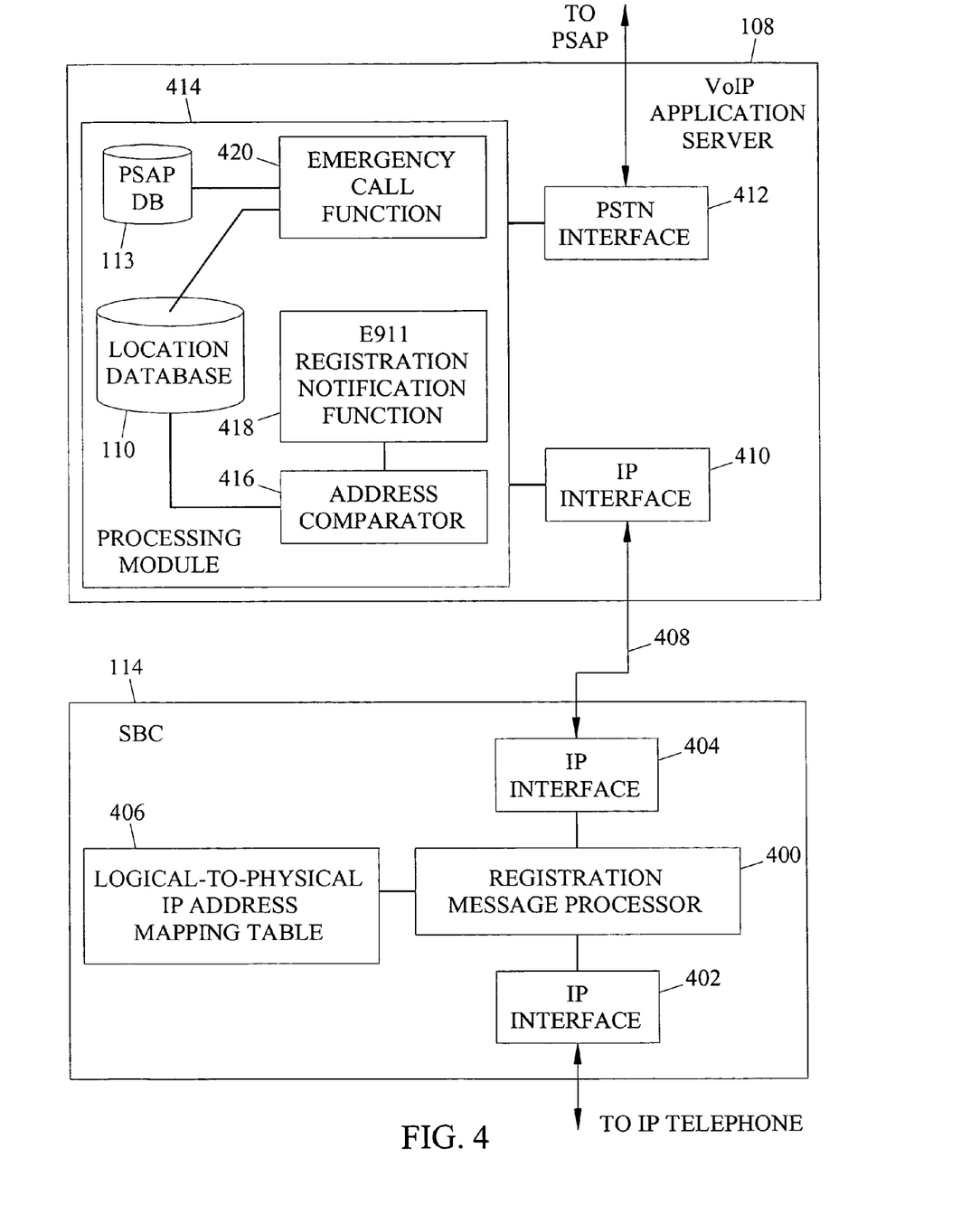
FIG. 4 is a block diagram of internal architecture of a VoIP application server and a session border controller (SBC) for providing E911 registration assistance to subscribers using portable IP communications devices according to an embodiment of the subject matter described herein.

FIG. 4 illustrates internal architecture of VoIP application server 108 and SBC 114 for providing E911 registration assistance to subscribers using portable IP communications devices according to an embodiment of the subject matter described herein. Referring to FIG. 4, SBC 114 includes a plurality of internal processing modules for routing and processing IP messages. In the illustrated example, SBC 114 includes a registration message processor 400, IP interfaces 402 and 404, and a phone logical-to-physical IP address mapping table 406. IP interfaces 402 and 404 are operable to send and receive IP messages over IP signaling links. IP interfaces 402 and 404 can include a physical layer for performing physical layer functions for IP signaling links. Further, IP interfaces 402 and 404 can include an IP layer for performing IP layer functions, such as IP forwarding. IP interfaces 402 and 404 can include transport layers for performing transport layer functions, such as UDP, TCP, or SCTP functions.

IP interface 402 may receive registration request messages from IP telephones, such as IP telephone 102. The registration request messages can include new physical IP addresses for the IP telephones. Registration message processor 400 may assign logical IP addresses to each telephone registered with IP application server 108. Mappings between telephone identifiers, logical IP addresses, and physical IP addresses may be maintained in logical-to-physical IP address mapping table 406. Table 3 shown below shows exemplary entries that may be included in table 406.

TABLE 3

| Logical-to-Physical IP Address Mappings | | |
| --- | --- | --- |
| Telephone ID | Logical IP Address | Physical IP Address |
| 9194605000 | 100.100.100.0 | 192.168.0.1 |
| 9194605001 | 100.100.100.1 | 192.168.0.10 |

For outgoing calls originating from an IP communications device connected to SBC 114, SBC 114 may map the physical IP address stored in the source IP address field of media and signaling packets to the logical IP address stored in the table. For incoming calls originating from devices that are not connected to SBC 114, SBC 114 may map the logical IP address stored in the destination IP address field of media and signaling packets to the physical IP address corresponding to the telephone ID stored in the table.

IP interface 402 can receive the registration request messages from IP telephones and forward the registration request messages to registration message processor 400. In one exemplary implementation, registration message processor 400 can modify the received registration request messages to include a new physical IP address assigned to an IP telephone. Alternatively, registration message processor 400 may generate a message specifically for communicating the new physical IP address to application server 108. Registration message processor 400 can forward the modified or generated message to IP interface 404 for transmission to application server 108 via an IP signaling link 408. As described above, the registration message may be formatted according to any suitable signaling protocol such as SIP, Cisco Skinny Client Control Protocol, or MGCP.

Application server 108 includes a plurality of internal processing modules for routing and processing IP messages. In the illustrated example, application server 108 includes an IP interface 410 and a PSTN interface 412 for interfacing with the IP and PSTN networks, respectively. Application server 108 also includes a processing module 414 for performing location database related services and E911 registration assistance according to the subject matter described herein.

IP interface 410 is operable to send and receive IP messages over IP signaling link 408. IP interface 410 can include a physical layer for performing physical layer functions for IP signaling links. Further, IP interface 410 can include an IP layer for performing IP layer functions, such as IP forwarding. IP interface 410 can also include transport layers for performing transport layer functions, such as TCP, UDP, or SCTP functions. IP interface 410 is operable to receive messages from SBC 114 that include a new physical IP address of an IP telephone. IP interface 410 can pass its received messages to module 414 for further processing.

PSTN interface 412 is operable to interface with PSTN 118 for sending and receiving messages. For example, PSTN interface 412 may send and receive SS7 signaling messages to and from PSAPs 116 and 122.

Processing module 414 of application server 108 can include an address comparator function 416 for comparing the physical IP address in the received message and a physical IP address of the IP telephone stored in location database 110 to determine whether the differences are sufficient to request a geographic location information update from the subscriber. As stated above, such an update may be necessary if IP telephone 102 is moved to a different building, a different city, a different state, or a location having a different street address. According to an embodiment, function 416 can determine whether the comparison indicates that the IP telephone has been moved to a different subnet. In this instance, if it is determined that the IP telephone has been moved to a different subnet, an E911 registration notification function 418 may be notified and, in response to the notification, prompt a subscriber associated with IP telephone 102 to update the geographic location information stored in database 110. The subscriber can be prompted by generating and communicating a message to the IP telephone via IP interface 410 for requesting an update of the IP telephone's geographic location information. Alternatively, a call transaction may be initiated with the IP telephone in which a prerecorded message is played for requesting an update to the geographic location information. In another example, an e-mail message may be sent to the subscriber associated with the IP telephone for requesting the update to the geographic location information. Further, the geographic location information may be updated by using a web interface in which the subscriber may enter updated geographic location information.

When a registration message with a physical IP address is received and address comparator 416 determines that the physical IP address in the message does not indicate a change in geographic location, address comparator 416 may refrain from triggering E911 registration notification function 418 to send the geographic location update prompt to the subscriber. As stated above, this determination may be performed by comparing the IP subnets in the received and stored IP addresses.

Further, processing module 414 includes an emergency call function 420. When application server 210 receives a message indicating an emergency call originated from an IP telephone, the message is forwarded to emergency call function 420. Function 420 can perform a lookup in location database 110 for a record associated with the IP telephone originating the emergency call. If a matching record is found, the appropriate PSAP may be identified using PSAP database 113, and the geographic location information in the record and the 911 call may be routed to the appropriate PSAP.

Figure 5:
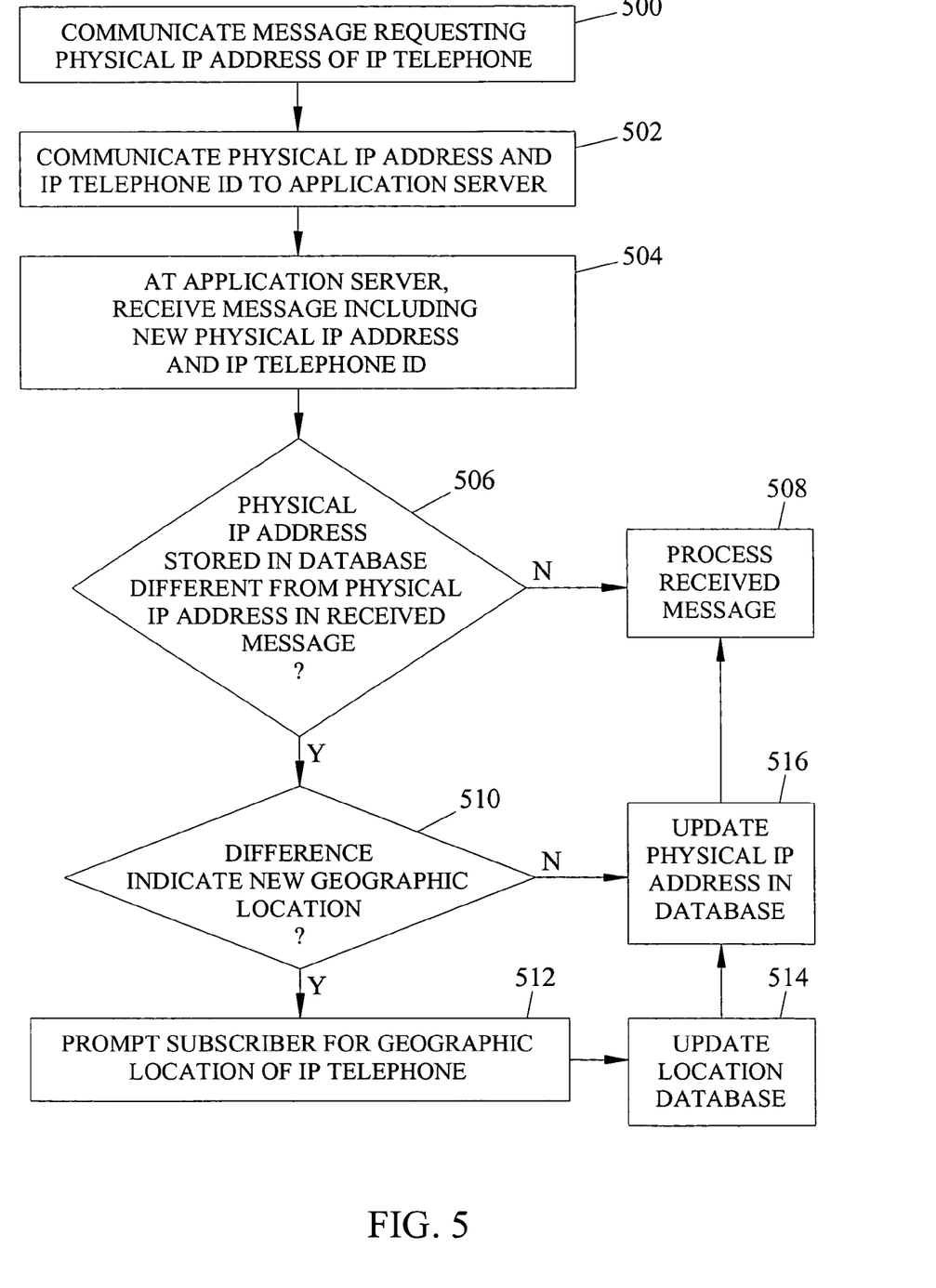
FIG. 5 is a flow chart of another exemplary process for providing E911 registration assistance for a subscriber using a portable IP communications device according to an embodiment of the subject matter described herein.

VoIP application server 108 may also communicate audit messages to IP telephone 102 for determining whether location database 110 should be provided with updated geographic location information. In response to an audit message, IP telephone 102 may communicate the current physical IP address of the IP telephone. Based on the communicated physical IP address, server 108 may determine whether IP telephone 102 has been moved and updated geographic location information should be provided. FIG. 5 is a flow chart of another exemplary process for E911 registration assistance for the subscriber when changing the location of IP telephone 102 according to an embodiment of the subject matter described herein. Referring to FIG. 5, the process starts at step 500 where application server 108 communicates a message to IP telephone 102 for auditing or requesting the physical IP address of IP telephone 102. The audit or request message may include the logical IP address of IP telephone 102. Further, the IP address of telephone 102 may be included in an extension to an Audit Endpoint (AUEP) message or an OPTIONS message. An AUEP message may be used to request device capability and current call states from IP telephone 102 for MGCP. An OPTIONS message may be used to obtain device capability in SIP. Application server 108 may periodically transmit message for requesting the physical IP address of an IP telephone.

IP telephone 102 may receive the audit message from application server 108. In response to the audit message, IP telephone 102 generates and communicates a message to application server 108 that includes the physical IP address of IP telephone 102 and that identifies IP telephone 102 (step 502). IP telephone 102 may be identified by its telephone number. In this example, the physical IP address may be the physical IP address of IP telephone 102 while in geographic region 106 or a new physical IP address of IP telephone 102 after being moved to geographic region 120. The message communicated to application server 108 may be any suitable message communicated to application server 108. The message may be communicated to application server 108 through IP network 121 and SBC 114 as described herein.

In step 504 of FIG. 5, application server 108 may receive the message from SBC 114 identifying IP telephone 102 and including the physical IP address of IP telephone 102. Location database 110 may include a record for IP telephone 102 that identifies a telephone number, a physical IP address, and geographic location information associated with IP telephone 102. The physical IP address may be a former physical IP address of IP telephone 102 when the IP telephone was plugged into IP network 104 within geographic region 106. Accordingly, the geographic location information associated with the former physical IP address would no longer be valid. Accordingly, in step 506, application server 108 determines whether the stored physical IP address is different from the IP address in the received message. Application server 108 may perform a lookup in location database 110 to determine whether the physical IP address received in the message from SBC 114 is different from the physical IP address stored for IP telephone 102 in location database 110.

If the physical IP address in the received message is not different from the physical IP address stored in location database 110, the received message is further processed by server application 108 (step 508). Otherwise, if the physical IP address in the received message is different from the physical IP address stored in location database 110, control proceeds to step 510, where application server 108 compares the physical IP address in the received message and the physical IP address stored in location database 110 to determine whether the differences are sufficient to indicate a change in geographic location as described herein. If it is determined that the difference indicates a change in geographic location, control proceeds to step 512 where the subscriber is prompted to update the geographic information. The subscriber may then provide updated geographic location information.

When provided with the updated geographic location information, the record in location database 110 associated with IP telephone 102 can be updated with the new geographic location information (step 514) and the received message processed (step 508). In the event of a 911 emergency call from IP telephone 102, application server 108 will know that PSAP 122 services the new location of IP telephone 102 and route the call and the geographic location information associated with IP telephone 102 to PSAP 122 for notifying emergency personnel of the 911 call. By updating the geographic location information for IP telephone 102, a message is not erroneously communicated to PSAP 116 for dispatching emergency personnel to the former location of IP telephone 102.

Returning to step 514, if it is determined that the difference between the IP address in the registration request message and the stored IP address does not include a change in geographic location, the physical IP address for the subscriber may be updated in location database 110 (step 516). Similarly, after the geographic information has been updated in step 218, the IP address may be updated in step 516. Once the IP address has been updated, the registration process continues in step 508 where the received registration request message is processed.

It will be understood that various details of the subject matter disclosed herein may be changed without departing from the scope of the disclosed subject matter. Furthermore, the foregoing description is for the purpose of illustration only, and not for the purpose of limitation, as the subject matter disclosed herein is defined by the claims as set forth hereinafter.

What is claimed is:

1. A method for providing emergency 911 (E911) registration assistance for a portable Internet Protocol (IP) communications device, the method comprising:
   (a) storing, in a voice over IP (VoIP) application server, an IP address of a portable IP communications device;
   (b) receiving, at the VoIP application server, a registration message from a session border controller (SBC) indicating an IP address of the portable IP communications device, wherein the SBC generates the registration message in response to receiving a registration request message from the portable IP communications device;

(c) determining, at the VoIP application server, whether a difference between the stored IP address and the received IP address indicated by the registration message indicates a change in geographic location of the portable IP communications device; and (d) in response to determining that the difference between the stored IP address and the IP address indicated by the received message indicates a change in geographic location of the portable IP communications device, prompting a subscriber to update stored geographic location information for providing E911 service to the subscriber.

2. The method of claim 1 wherein steps (a)-(d) are performed at the VoIP application server.

3. The method of claim 1 wherein the portable IP communications device comprises a portable IP telephone.

4. The method of claim 1 wherein storing an IP address of the portable IP communications device includes maintaining, in the VoIP application server, a database including a physical IP address of the portable IP communications device.

5. The method of claim 4 wherein maintaining a database includes maintaining a mapping between the stored physical IP address and the geographic location information in the database.

6. The method of claim 1 wherein the registration message utilizes a protocol selected from the group consisting of Session Initiation Protocol (SIP), Cisco Skinny Client Control Protocol, and Media Gateway Control Protocol (MGCP).

7. The method of claim 1 wherein step (c) includes determining whether the difference indicates that the IP addresses are associated with the same subnet.

8. The method of claim 7 wherein, in response to determining that the IP addresses are associated with the same subnet, refraining from prompting a subscriber to update the stored geographic location information for the IP communications device.

9. The method of claim 1 comprising, in response to the prompting:
(a) receiving updated geographic location information from the subscriber; and
(b) storing the updated geographic location information.

10. The method of claim 9 comprising communicating the updated geographic location information to an emergency call center.

11. The method of claim 1 wherein prompting the subscriber includes initiating a call with the subscriber geographic location information.

12. The method of claim 1 wherein prompting the subscriber includes for requesting updated geographic location information from the subscriber via a web interface.

13. The method of claim 1 wherein prompting the subscriber includes sending a message from the VoIP application server to the portable IP communications device.

14. A method for providing emergency 911 (E911) registration assistance for a portable Internet Protocol (IP) communications device, the method comprising:
(a) storing, in a voice over IP (VoIP) application server, an IP address of a portable IP communications device;
(b) communicating, from the VoIP application server to the portable IP communications device, an audit message for requesting an IP address of the portable IP communications device;
(c) receiving, at the VoIP application server, a response message indicating an IP address of the portable IP communications device, wherein the response message is transmitted in response to the audit message to the VoIP application server through a session border controller (SBC), wherein the SBC generates the response message in response to receiving a response, to the audit message, from the portable IP communications device;

(d) determining, at the VoIP application server, whether a difference between the stored IP address and the received IP address indicated by the response message indicates a change in geographic location of the portable IP communications device; and (e) in response to determining that the difference between the stored IP address and the IP address indicated by the response message indicates a change in geographic location of the portable IP communications device, prompting a subscriber to update stored geographic location information for providing E911 service to the subscriber.

15. The method of claim 14 wherein steps (a)-(e) are performed at the VoIP application server.

16. The method of claim 14 wherein the audit message is a message selected from the group consisting of an Audit Endpoint (AUEP) message and a Session Initiation Protocol (SIP) OPTIONS message.

17. The method of claim 14 wherein storing an IP address of the portable IP communications device includes maintaining a database in the VoIP application server including a physical IP address of the portable IP communications device.

18. The method of claim 17 wherein maintaining a database includes maintaining a mapping between the stored physical IP address and the geographic location information in the database.

19. A method for providing emergency 911 (E911) registration assistance for an Internet Protocol (IP) communications device, the method comprising:
(a) at a session border controller (SBC):
(i) maintaining a mapping between a first physical IP address of an IP communications device and a logical IP address of the IP communications device;
(ii) receiving, from the IP communications device, a registration message indicating a second physical IP address of the IP communications device; and
(iii) communicating the registration message to a voice over IP (VoIP) application server indicating the second physical IP address of the IP communications device; and
(b) at the VoIP application server:
(i) storing the first physical IP address of the IP communications device;
(ii) receiving the registration message from the SBC indicating the second physical IP address of the IP communications device;
(iii) determining whether a difference between the first and second physical IP addresses indicates a change in geographic location of the IP communications device; and
(iv) in response to determining that the difference between the first and second physical IP addresses indicates a change in geographic location of the IP communications device, prompting a subscriber to update stored E911 geographic location information for the IP communications device.

20. A voice over IP (VoIP) application server providing emergency 911 (E911) registration notification assistance for an Internet Protocol (IP) communications device, the IP application server comprising:

(a) a location database in the VoIP application server for storing an IP address of a portable IP communications device;

(b) an IP interface in the VoIP application server and adapted to receive a registration message from a session border controller (SBC) indicating an IP address of the portable IP communications device, wherein the SBC generates the registration message in response to receiving a registration request message from the portable IP communications device;

(c) an address comparator function in the VoIP application server and adapted to determine whether a difference between the stored IP address and the IP address indicated by the received registration message that is associated with the portable IP communications device indicates a change in geographic location of the portable IP communications device; and (d) an E911 registration notification function in the VoIP application server for prompting a subscriber to update stored geographic location information at which the subscriber receives E911 service in response to a determination that the difference between the stored IP address and the IP address indicated by the received registration message indicates a change in geographic location of the IP communications device.

21. The voice over IP (VoIP) application server of claim 20 wherein the portable IP communications device comprises a landline IP telephone.

22. The VoIP application server of claim 20 wherein the location database is operable to associate the geographic location information with the stored IP address.

23. The VoIP application server of claim 20 wherein the IP interface is operable to utilize a protocol selected from the group consisting of Session Initiation Protocol (SIP), Cisco Skinny Client Control Protocol, and Media Gateway Control Protocol (MGCP).

24. The VoIP application server of claim 20 wherein the address comparator is operable to determine whether the stored IP address and the IP address indicated by the received registration message are associated with the same subnet.

25. The VoIP application server of claim 24 wherein the E911 registration notification function is operable to refrain from prompting the subscriber to update stored geographic location information in response to determining that the stored IP address and the IP address indicated by the received registration message indicates that the IP addresses are associated with the same subnet.

26. The VoIP application server of claim 20 wherein the IP interface is operable to receive updated geographic location information from the subscriber and operable to receive an emergency call message from the IP communications device; and
comprising an emergency call function operable to communicate the updated geographic location information to an emergency call center in response to receiving the emergency call message.

27. The VoIP application server of claim 20 wherein the E911 registration notification function is operable to initiate a call with the subscriber for requesting the updated geographic location information.

28. The VoIP application server of claim 20 wherein the E911 registration notification function is adapted to request the updated geographic location information by sending a message to the portable IP communications device.

29. The VoIP application server of claim 20 wherein the E911 registration notification function is operable to prompt the subscriber for the updated geographic location information via a web interface.

30. A voice over IP (VoIP) application server providing emergency 911 (E911) registration notification assistance for an Internet Protocol (IP) communications device, the IP application server comprising:

(a) a location database in the VoIP application server for storing an IP address of a portable IP communications device;

(b) an IP interface in the VoIP application server and adapted to communicate a request message for requesting an IP address of the portable IP communications device and adapted to receive a response message from a session border controller (SBC) indicating an IP address of the portable IP communications device, wherein the SBC generates the response message in response to receiving a response, to the request message, from the portable IP communications device;

(c) an address comparator function in the VoIP application server and adapted to determine whether a difference between the stored IP address and the IP address indicated by the received response message that is associated with the portable IP communications device indicates a change in geographic location of the portable IP communications device; and (d) an E911 registration notification function in the VoIP application server for prompting a subscriber to update stored geographic location information at which the subscriber receives E911 service in response to a determination that the difference between the stored IP address and the IP address indicated by the received response message indicates a change in geographic location of the IP communications device.

31. The VoIP application server of claim 30 wherein the IP interface is operable to communicate a request message selected from the group consisting of an Audit Endpoint (AUEP) message and a Session Initiation Protocol (SIP) OPTIONS message.

32. The VoIP application server of claim 30 wherein the location database is operable to associate the geographic location information with the stored IP address.

33. The VoIP application server of claim 32 wherein the IP interface is operable to receive updated geographic location information from the subscriber and operable to receive an emergency call message from the IP communications device; and
comprising an emergency call function operable to communicate the updated geographic location information to an emergency call center in response to receiving the emergency call message.

34. A system for providing emergency 911 (E911) registration notification assistance to an Internet Protocol (IP) communications device, the system comprising:

(a) a session border controller (SBC) including:
(i) a logical-to-physical IP address mapping table for mapping between a first physical IP address of an IP communications device and a logical IP address of the IP communications device; and
(ii) a registration message processor for receiving, from the IP communications device, a first registration message indicating a second physical IP address of the IP communications device, generating a second registration message indicating the second physical IP address of the IP communications device, and forwarding the second registration message to a destination; and (b) a voice over IP (VoIP) application server including:
(i) a location database for storing the first physical IP address of the IP communications device;
(ii) a communications module for receiving the second registration message from the SBC indicating the second physical IP address of the IP communications device;
(iii) an address comparator function for determining whether a difference between the first and second physical IP addresses indicates a change in geographic location of the IP communications device; and
(iv) an E911 registration notification function, responsive to a determination that the difference indicates a change in geographic location of the portable IP communications device, for prompting a subscriber to update stored geographic location information.

35. A computer program product comprising computer executable instructions embodied in a computer readable medium for performing steps comprising:
(a) storing, in a voice over IP application server, an IP address of a portable IP communications device;
(b) receiving, at the VoIP application server, a registration message from a session border controller (SBC) indicating an IP address of the portable IP communications device, wherein the SBC generates the registration message in response to receiving a registration request message from the portable IP communications device;
(c) determining, at the VoIP application server, whether a difference between the stored IP address and the received IP address indicated by the registration message indicates a change in geographic location of the portable IP communications device; and
(d) in response to determining that the difference between the stored IP address and the IP address indicated by the received message indicates a change in geographic location of the portable IP communications device, prompting a subscriber to update stored geographic location information for providing E911 service to the subscriber.

36. The computer program product of claim 35 wherein steps (a)-(d) are performed at the VoIP application server.

37. The computer program product of claim 35 wherein the portable IP communications device comprises a portable IP telephone.

38. The computer program product of claim 35 wherein storing an IP address of the IP communications device includes maintaining a database including a physical IP address of the portable IP communications device.

39. The computer program product of claim 38 wherein maintaining a database includes maintaining a mapping between the stored physical IP address and the geographic location information in the database.

40. The computer program product of claim 35 wherein the registration message utilizes a protocol selected from the group consisting of Session Initiation Protocol (SIP), Cisco Skinny Client Control Protocol, and Media Gateway Control Protocol (MGCP).

41. The computer program product of claim 35 wherein step (c) includes determining whether the difference indicates that the IP addresses are associated with the same subnet.

42. The computer program product of claim 41 wherein, in response to determining that the IP addresses are associated with the same subnet, refraining from prompting a subscriber to update the stored geographic location information for the IP communications device.

43. The computer program product of claim 35 comprising, in response to the prompting:
(a) receiving updated geographic location information from the subscriber; and
(b) storing the updated geographic location information.

44. The computer program product of claim 35 comprising communicating the updated geographic location information to an emergency call center.

45. The computer program product of claim 35 wherein prompting the subscriber includes initiating a call with the subscriber geographic location information.

46. The computer program product of claim 35 wherein prompting the subscriber includes for requesting updated geographic location information from the subscriber via a web interface.

47. The computer program product of claim 35 wherein prompting the subscriber includes sending a message to the portable IP communications device.

48. A computer program product comprising computer executable instructions embodied in a computer readable medium for performing steps comprising:
(a) storing, in a voice over IP (VoIP) application server, an IP address of a portable IP communications device;
(b) communicating, from the VoIP application server to the IP communications device, an audit message for requesting an IP address of the portable IP communications device;
(c) receiving, at the VoIP application server, a response message indicating an IP address of the portable IP communications device, wherein the response message is transmitted, in response to the audit message, to the VoIP application server through a session border controller (SBC), wherein the SBC generates the response message in response to receiving a response, to the audit message, from the portable IP communications device;
(d) determining, at the VoIP application server, whether a difference between the stored IP address and the received IP address indicated by the response message indicates a change in geographic location of the portable IP communications device; and
(e) in response to determining that the difference between the stored IP address and the IP address indicated by the response message indicates a change in geographic location of the portable IP communications device, prompting a subscriber to update stored geographic location information for providing E911 service to the subscriber.

49. The computer program product of claim 48 wherein steps (a)-(e) are performed at the VoIP application server.

50. The computer program product of claim 48 wherein the audit message is a message selected from the group consisting of an Audit Endpoint (AUEP) message and a Session Initiation Protocol (SIP) OPTIONS message.

51. The computer program product of claim 48 wherein storing an IP address of the IP communications device includes maintaining a database in the VoIP application server including a physical IP address of the portable IP communications device.

52. The computer program product of claim 51 wherein maintaining a database includes maintaining a mapping between the stored physical IP address and the geographic location information in the database.

* * * * *